(12) United States Patent
Walke et al.

(10) Patent No.: US 7,095,722 B1
(45) Date of Patent: Aug. 22, 2006

(54) METHOD FOR THE OPERATION OF WIRELESS BASE STATIONS FOR PACKET TRANSFER RADIO SYSTEMS HAVING A GUARANTEED SERVICE QUALITY

(75) Inventors: Bernhard Walke, Aachen (DE); Norbert Esseling, Bonn (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 592 days.

(21) Appl. No.: 09/868,386

(22) PCT Filed: Oct. 11, 2000

(86) PCT No.: PCT/EP00/10089

§ 371 (c)(1),
(2), (4) Date: Aug. 30, 2001

(87) PCT Pub. No.: WO01/30024

PCT Pub. Date: Apr. 26, 2001

(30) Foreign Application Priority Data

Oct. 18, 1999 (DE) .............................. 199 50 005

(51) Int. Cl.
*H04B 7/14* (2006.01)
(52) U.S. Cl. .................. 370/315; 370/338; 370/337; 370/328; 455/11.1
(58) Field of Classification Search ............... 370/338, 370/315; 455/422.1, 462
See application file for complete search history.

(56) References Cited

U.S. PATENT DOCUMENTS

| | | | | |
|---|---|---|---|---|
| 5,761,194 A | * | 6/1998 | Bahlenberg ................. | 370/315 |
| 5,898,679 A | * | 4/1999 | Brederveld et al. ......... | 370/315 |
| 5,907,540 A | * | 5/1999 | Hayashi ...................... | 370/315 |
| 5,930,240 A | * | 7/1999 | Wichman .................... | 370/315 |
| 6,424,633 B1 | * | 7/2002 | von Brandt ................. | 370/280 |
| 6,473,617 B1 | * | 10/2002 | Larsen et al. ............... | 455/446 |
| 6,549,786 B1 | * | 4/2003 | Cheung et al. ............. | 455/524 |
| 6,721,305 B1 | * | 4/2004 | Chan et al. ................. | 370/349 |
| 6,826,165 B1 | * | 11/2004 | Meier et al. ................ | 370/338 |

* cited by examiner

*Primary Examiner*—Seema S. Rao
*Assistant Examiner*—Michael J. Moore
(74) *Attorney, Agent, or Firm*—Larry Liberchuk

(57) ABSTRACT

A method for the operation of wireless base stations for packet transfer radio systems having guaranteed service quality. The method includes increasing the supply ranges of packet oriented transferring radio stations, which are located outside the range of the central base stations and are supplied by wireless base stations (relay stations). In contrast to conventional wireless transfer systems, a communications service quality is guaranteed. A common time interconnected capacity assignment method is used. The capacity assignment is generated for an access point (AP) by mobile and forward terminals (MT, FMT) which can be reached directly. Individual MTs are present in the form of wireless base stations and serve as relay stations (FMTs) for the MTs outside the range of an AP. For an AP, FMTs appear as MTs. The FMT forms a partial frame structure in a part of the AP distribution capacity transfer system, which is embedded in the time frame structure dictated by the commanding central station. Adherence to a required service quality guarantee is achieved by capacity assignment algorithms.

15 Claims, 3 Drawing Sheets

Figure 1:
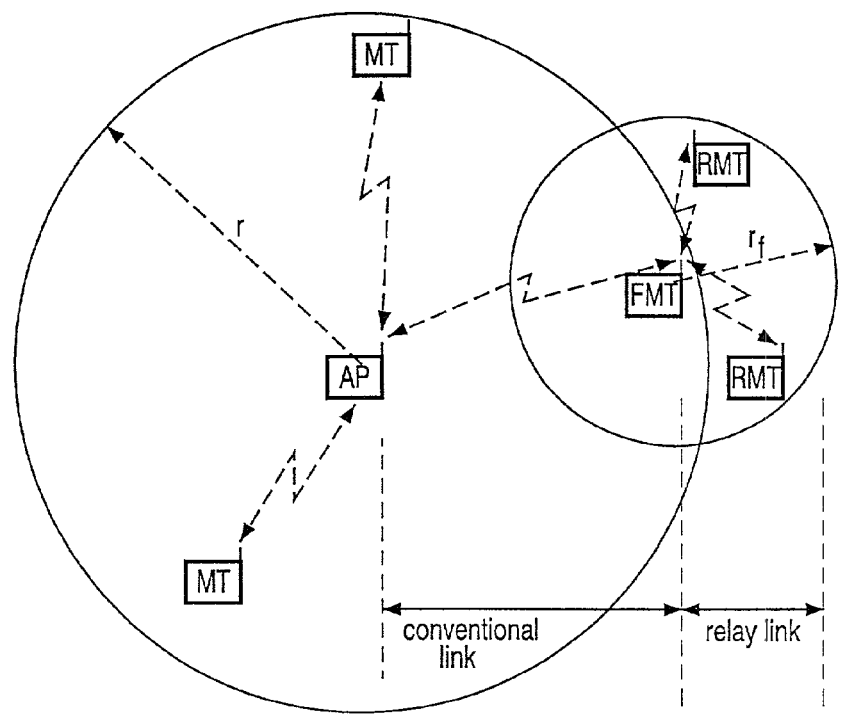

METHOD FOR THE OPERATION OF WIRELESS BASE STATIONS FOR PACKET TRANSFER RADIO SYSTEMS HAVING A GUARANTEED SERVICE QUALITY

The invention relates to a novel method of increasing the supply ranges of packet oriented transferring radio stations, which are located outside the range of a central base station and are supplied by wireless base stations that have a relay function. In contrast to conventional wireless transfer systems, a communications service quality is guaranteed, which service quality is featured by parameters such as effective data transfer rate, packet delay time, variation of the packet delay time, and so on. Practical fields of application for such systems may be, for example:

Local Area Networks for the data and multi-media communication,
Access networks to telecommunications networks,
Networks for connecting fixed and mobile subscribers, and for interconnecting mobile subscribers.

In future radio systems different services are dynamically rendered available to the user of a telecommunications service. These services are different as regards requirements of the service quality and the required transmission capacity. For the assignment of the capacity necessary for the transmission of data (including video and audio) to the stations that wish to transmit, various approaches in radio systems are known:

Uncoordinated access (for example, HIPERLAN type 1 [3] or IEEE 802.11[7]). With this type of access the stations wishing to transmit access a radio channel in uncoordinated fashion. Co-ordination is obtained by a decentralized strategy of assignment, without central assignment. In these systems, service quality can be guaranteed only with certain probability or not guaranteed at all.

Exclusive assignment of transmission capacity in the time/code/frequency range to a station that wishes to transmit, while a distinction is made between two main groups:

The capacity is assigned in a connection-oriented manner by means of a channel that has a fixed transmission rate and is therefore also simultaneously exclusively reserved for the duration of the connection (for example, GSM [2] with the exception of GPRS [4]).

The capacity is dynamically assigned by the base station to the individual associated stations, depending on their requirements [8], [1], [5], [4], while multicell systems are possible. This assignment is controlled by a central station, which is either known initially [5], or determined by a system itself [6]. In order to guarantee a service quality, special measures (call accept and scheduling, [8]) are necessary.

In the following part, radio networks with a central controller are discussed. An assignment of transmission capacity by a central assignment point for a station that wishes to transmit/receive (Mobile Terminal (MT). A mobile terminal which, however, may also act as a base station) is also possible if the MT is located in the coverage area of the base station. An MT not located in the coverage area is called a Remote Mobile Terminal ((RMT). An MT, whose radio relay conditions do not permit a direct radio link to the Access Point (AP). The RMT may have extended functions compared to the MT). Access Point (AP) can be a central station which may be stationary or mobile. This station organizes a network assigned to it. The role of the central station may change in several systems (for example, ad hoc HIPERLAN 2 [6]. Reasons for the insufficient radio coverage of the RMT may be, for example, a large distance from the central base station, electromagnetic interference, level breakdown as a result of shadowing of the radio waves by obstacles, and multi-path propagation. If, however, the RMT can have a sufficient receiving quality of the data from another station (Forwarder Mobile Terminal (FMT). An MT that can additionally take over the tasks of a relay station and thus become a wireless base station), which other station maintains a direct or indirect connection to the AP, and can send data thereto, the RMT can, according to the invention, be controlled by the base station.

The new method controls the communication between FMT and MT or RMT respectively, with the object of putting RMT in the same category as an MT as regards service quality.

The method permits the sequential linking of a plurality of relay connections, for example, AP↔FMT↔ . . . . ↔FMT↔RMT. An FMT compares to the higher-order FMT, which is closer to AP, as an MT, and compares to the lower-order FMT as an AP.

The invention utilizes a common time-interlocking capacity assignment. The capacity assignment for stations that can be directly reached by the AP (FMT, MT) is realized from the base station (AP) for example [5]). This is the first radio path (hop) seen from the base station. This may be an active passive (sleeping), connection-oriented or connections, packet-oriented data link or signaling link. The control data of the AP for the radio channel to be occupied by AP, MT and FMT of the first hop are cyclically transmitted in predetermined distances, or dynamically in announced or known distances. The AP enables all the MTs and FMT to have a random access in its coverage area, while the result of the access is explicitly or implicitly announced to the stations. In case of the collisions, mechanisms for collision solutions are used. The type of dynamic capacity assignment is state of the art and explained in, for example, [1], [8], [5].

This type of channel assignment is extended in this invention in that separate MTs act as wireless base stations and, in addition, serve as a relay station (FMT) and against RMTs appear APs, but against APs appear at MTs.

The FMT utilizes the transmission capacity assigned by the AP partly for its own purpose and partly to enable the FMT-controlled RMT to transmit to the AP via a second radio path according to the same or similar rules to those used by the AP.

Each relay station used as an FMT embodies a partial frame structure which is embedded in the frame structure predefined by the higher-order central station. For the partial frame structure only the capacity assigned to the FMT is used. The partial frame structure is similar to the higher-order frame structure, so that a communication to unchanged MTs, but also to specially adapted stations, is possible. This means that the partial frame structure for its part contains areas in which occupied capacity is announced, a data transfer to the MT (or RMT, respectively) can take place (remote downlink) as well as a data transfer from the MT (or RMT, respectively) to the FMT (remote uplink). Also a random access is rendered available. The subdivision into partial frame structures may be effected recursively i.e. more than one relay links can be cascaded. The control of the communication and of the capacity occupations on the individual hops may be carried out by:

The base station (AP), which controls the transmission capacity for all the stations connected to it directly or indirectly i.e. by relay links or cascaded relay links. The relay stations (FMT) then have the object of relaying the reservation of the transmission capacity determined by the base station to the RMTs, and accordingly constructing the partial frames.

Irrespectively of each other, by the AP for its MTs and FMTs and by the FMTs for their RMTs. Each FMT gets capacity from the AP and manages this capacity autonomously like an AP. In existing systems (for example, H/2[5]) this may be the uplink area assigned to this FMT. This procedure offers the advantage that no change needs to be made in existing systems (more particularly, AP and MT), because the partial frame structure is fully integrated with the frame structure that already exists. Only the new functions of the FMT are added. The transmission capacity assigned to the FMT is managed largely autonomously by the FMT and organized so that the RMTs reach the AP via the FMT or are reached by the AP, respectively.

Any random combination of control by FMT and AP.

To realize the FMT it is sufficient, based on the time-dependent structure i.e. division of the transmission capacity into a time-dependent frame structure and a subdivision into further time-dependent partial frame structures, to have only one transceiver portion. Where appropriate, a plurality of transceiver portions per FMT can be used. The length of the frames of the AP and partial frames of the FMT may vary dynamically and have different lengths. Also a dynamic reassignment of the phases within the frames is possible, which reassignment also includes the lacking of several phases and the use of new phases. Furthermore, the phases may be used for data transmission in the point-to-multipoint mode. In addition to this mode it is possible to organize a direct data transmission between individual RMTs and between RMT and MT, which do not operate as an FMT.

In addition to the assignment of time ranges (TDMA) for the partial frames, also an assignment of frequency ranges (FDMA) and code ranges (CDMA) is possible. The decisive factor is that the central base station divides its available capacity into sub-capacities, which on their part are assigned to the individual relay stations (FMT). For this purpose, the above-described management of these sub-ranges and the assignment of individual parts of these sub-ranges to the MTs or RMTs is used. In suitable systems (for example, H/2 ad hoc [6]), each MT can additionally become an AP, while with respect to this there are again RMTs.

With suitable radio conditions it is also possible with the proposed method to provide a space-dependent assignment of transmission capacity, so that the partial frame structure is simultaneously used at different locations of the centrally controlled network.

To guarantee a requested service quality, the possibility of the specific and organized assignment of transmission capacity is a condition. Adhering to the service quality is the task of the units (AP, FMT), which control a distribution of the available capacity for the transmission of the individual stations. Suitable strategies are basically already known [8] and can be adapted for this invention. The necessary changes consist of talking the necessary capacity into account for the organization of the individual partial frame structures, as they have been described above.

Figure 2:
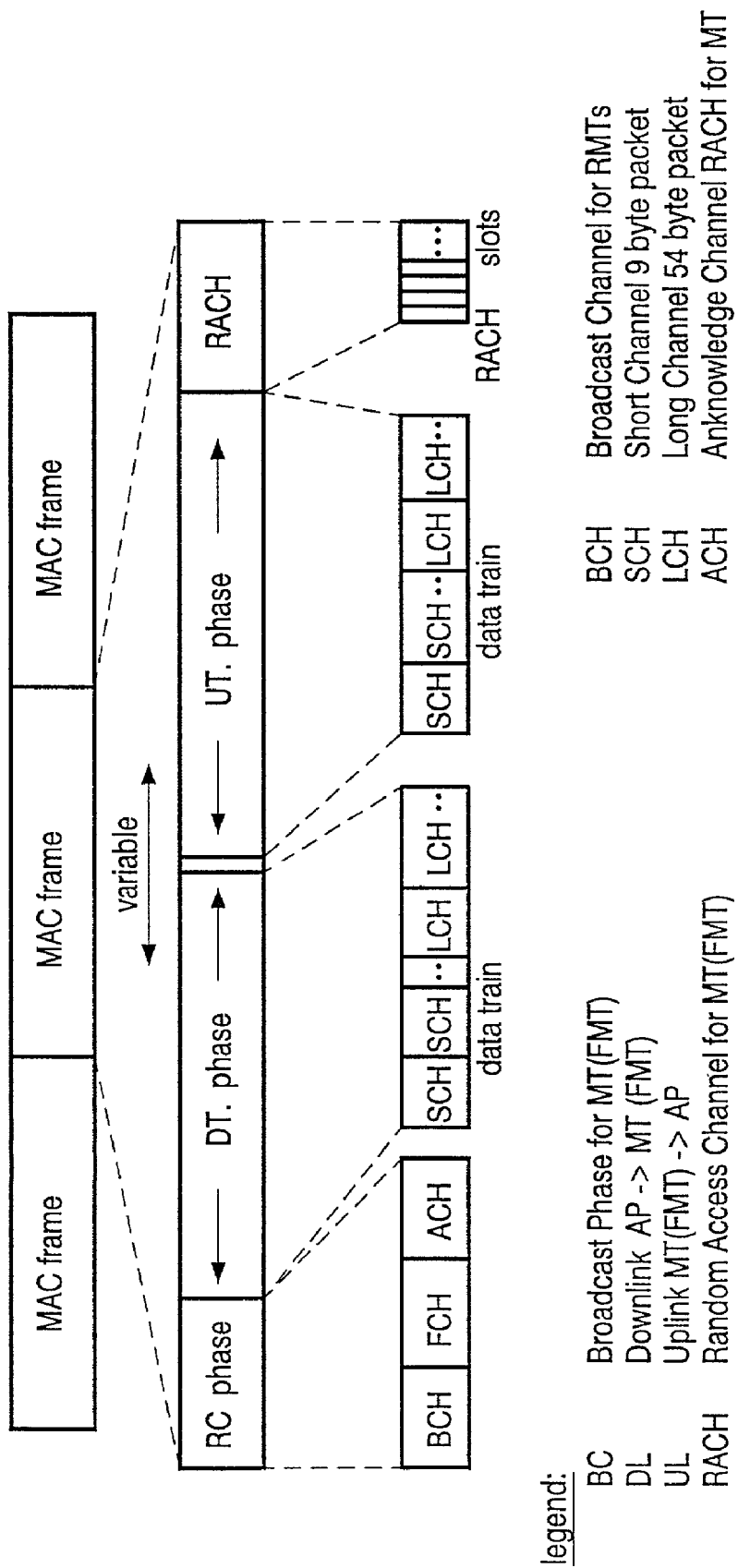
Figure 3:
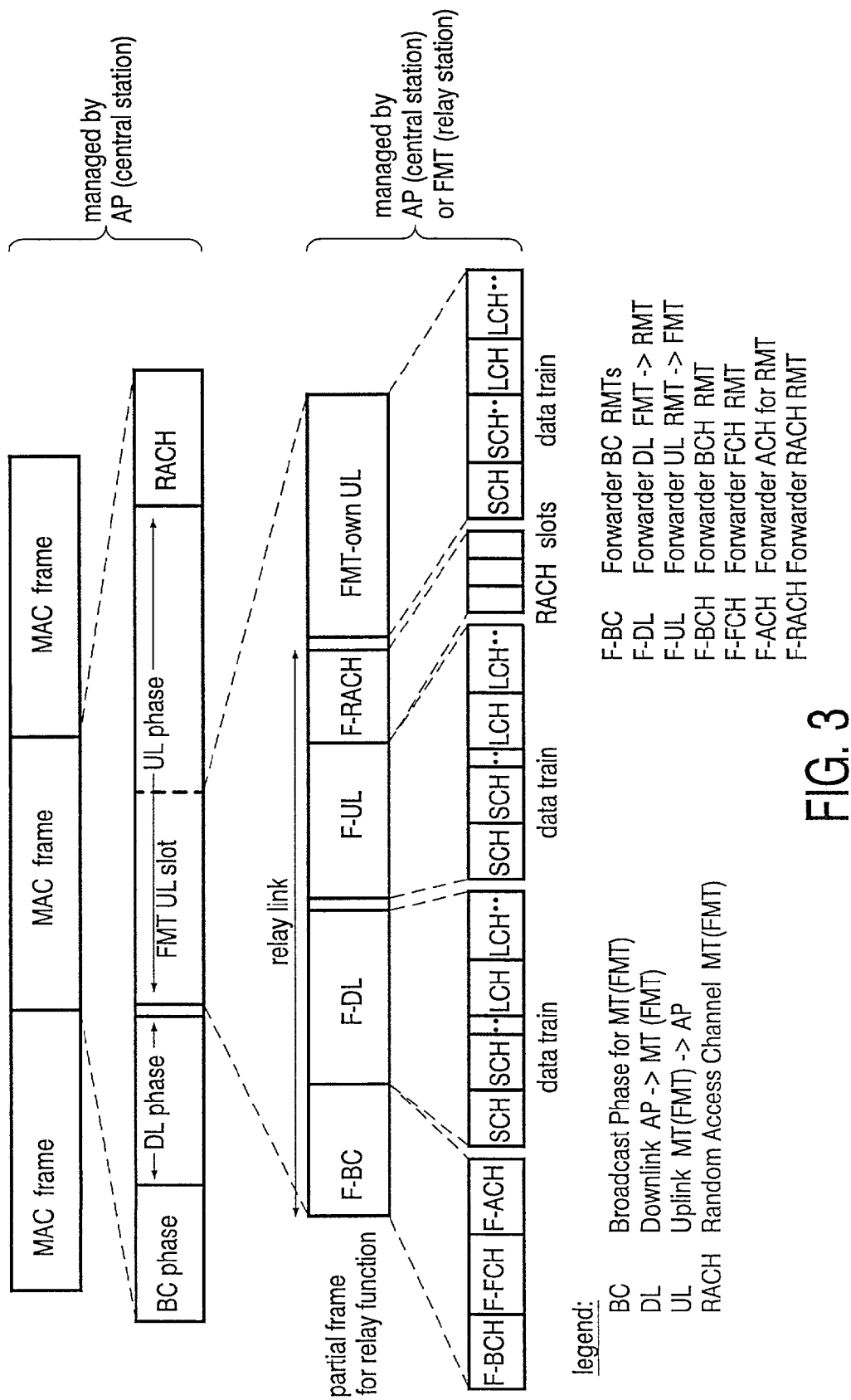

An example of embodiment is shown in the drawings and will be described in more detail in the following. As an example for the invention, an extension of the HIPERLAN 2 (H/2) system [5] is further discussed, in which:

FIG. 1 shows a scenario to be used for the invention and the arrangement of the respective stations, FIG. 2 shows the H/2-system frame structure on the radio interface, and FIG. 3 shows the frame structure relevant to the invention as it is proposed in this invention as an example for H/2.

FIG. 1 shows a situation by way of example as it may occur in packet transfer radio networks. An H/2 system is shown, which works in the so-called centralized mode i.e. the individual terminals of the system are controlled by the base station (AP). In addition, there is the direct mode, in which mobile terminals controlled by the AP can directly communicate with one another. The direct mode assumes that all the terminals of a cell can receive the organization information directly from the AP. If it is assumed that r is the radius of the cell in which the individual MTs can receive the AP and can also exchange information with the AP, the RMTs outside this radius, or due to the radio conditions, respectively, are unable to exchange data with the AP.

The invention looks at solutions for connecting RMTs via APs. A precondition for this is that the RMT is located within the radius $r_f$ around an MT. These MTs are then used as relay stations (FMT), which form a bridge between AP and RMT and can bidirectionally transfer data. The transfer of the data is controlled by the AP in the H/2 system. For this purpose, a periodic frame structure is transmitted, which is divided into several sub-ranges. In FIG. 2 the time-dependent structure is shown as it is used in the H/2 system.

First, general information about the cell and the associated AP is transmitted in the so-called Broadcast Channel (BCH). Then, the AP transmits organization data in the Frame Control Channel (FCCH) about the future occupation of the remaining MAC frame, whose overall length in H/2 is constantly 2 ms. In the Acknowledge Channel (ACH) that follows, the terminals are informed of the result with respect to the access to the channel to be explained in the following, the random access. This is followed by the downlink phase, in which data are transmitted from the AP to the individual MTs. These data can be transmitted in long protocol data units of 54 bytes, Long Channel (LCH) or short data units of 9 bytes, Short Channel (SCH). In addition, it is possible for the individual data units to be combined to data trains. In the uplink phase the individual mobile terminals have the opportunity to transmit their data to the AP. At what instant each individual terminal is allowed to send is announced already in the FCCH. At the end of the MAC frame there is a phase in which all the terminals are allowed to access the radio channel at random according to specific rules. This phase is referred to as Random Access Channel (RACH) and is laid down in H/2.

FIG. 3 shows the extension of a MAC frame by a partial frame for relay operation, as defined for the H/2 system in this invention. The MAC frame is defined by the AP and to the FMT is assigned a certain transmission capacity on the uplink, which capacity can be assigned at random by the FMT via a partial frame for the transmission of its own UL data to the AP, and the transmission of UL/DL data between FMT and RMTs. The AP sees this partial frame as an FMT uplink slot, while it is ensured by a suitable featuring of the data packets, that the AP does not interpret data, which are transmitted in this phase for the relay link from the FMT to the RMT, as uplink data of the FMT. In the partial frame again the individual phases of the H/2 are used, but in a form adapted to the sub-structure.

In this example the FMT first transmits the information necessary for the organization of the data link in the Forwarder Broadcast Channel ((F-BCH), a broadcast channel which is generated by the FMT and received by the RMTs). Then, the RMTs are informed of the further structure of the partial frame in the Forwarder Frame Control Channel (F-FCH). In the subsequent Forwarder Acknowledge Channel (F-ACH), the RMTs are informed of the result for a transmission on the F-RACH to be explained hereinafter. Then the Forwarder Downlink phase (FDL) takes place, in which the FMT sends data to the addressed RMTs. This may be effected in a random sequence of Long Channel (LCH) data packets, (data packets of 54 bytes) or Short Channel (SCH) data packets, (data packets of 9 bytes). The individual packets may then also be combined to packet trains. After a change-over time for the transceiver of the FMT, the FMT can receive data in the Forwarder Uplink (F-UL, this is a link from RMT→FMT) from an RMT. Again random sequences of LCH and SCH data packets may show up then. In the F-RACH phase the RMTs can send data to the FMT at random, which happens in the partial frame defined in this invention by analogy with the mechanisms for random access already laid down for H/2. Subsequent to the phases for the relay link, the FMT connects its own uplink to transmit data to the central station of the system. Standard mechanisms of the H/2 are used then.

The organization of the partial frame may be effected autonomously by the FMT, but also be controlled by the AP. The FMT is a wireless H/2 base station. The RMT is a wireless terminal (MT) as defined in accordance with the H/2 standard.

It is furthermore possible to again define a partial frame for a cascaded relay link in the F-DL phase of the FMT. This provides a recursive structure of partial frames, whose depth corresponds to the number of sub-links (hops).

The partial frame may have the same length as the frames of the AP, or a different length. It seems to be efficient to have the FMT periodically generate the partial frame with the same timing as the AP, but with a respective offset, see FIG. 3.

LITERATURE

[1] DE 195 35 329 A1
[2] ETSI *Digital cellular telecommunication; Mobile Station-Base Station System (MS-BSS) interface; General Aspects and principles, GTS GSM 04.01.* European Telecommunications Standards Institute, November 1996.EN.
[3] ETSI *Broadband Radio Access Network (BRAN); High Performance Radio Local Area Network (HIPERLAN) Type 1; Functional Specification V1.2.1, EN 300 652.* European Telecommunications Standards Institute, September 1998.EN.
[4] ETSI *Digital cellular telecommunication (Phase 2+); General Packet Radio Service (GPRS); Overall description of the GPRS radio interface, TR 101 350, (GSM 03.64).* European Telecommunications Standards Institute, October 1998.EN.
[5] ETSI *Broadband Radio Access Networks (BRAN); HIPERLAN Type 2, Functional Specification Data Link Control (DLC) Layer Part 1—Basic Data Transport Function, DTS/BRAN030003-1 V0.i* European Telecommunications Standards Institute, September 1999.DTS
[6] ETSI *Broadband Radio Access Networks (BRAN); HIPERLAN Type 2 Functional Specification Data Link Control (DLC) Layer Part 4—Extension for Home Environment, DTS/BRAN-0020004-4 V0.a.* European Telecommunications Standards Institute, August 1999.DTS
[7] IEEE *Wireless LAN Medium Access Control (AMC) and Physical Layer (PHY) specifications Broadband Radio Access Network (BRAN);* Standard 802.11, IEEE, New York, November 1997.EN
[8] D. Petras *Entwicklung und Leistungsbewertung einer ATM-Funkschnittstelle.* Aachener Beiträge zur Mobil- und Telekommunikation, Band 18, Wissenschraftsverlag Mainz, Aachen, 1999.

The invention claimed is:

1. A method with wireless base stations in centrally controlled radio systems, which systems transfer packets and guarantee service quality and comprise a controlling access point (AP), mobile terminals (MTs) and stations working as a forwarder mobile terminal (FMT) for the connection of a remote mobile terminal (RMT) not connected to the AP by radio for bidirectional communication between RMT and AP, the FMT maintaining both a connection to the AP and to the RMT by radio, characterized
   (a) in that a time-shifted partial frame structure is generated by the FMT based on a system-wide known frame structure of the AP, which partial frame structure is used by the FMT to control the transmission from the FMT to the RMT and back, while the partial frames transport signaling data, useful data and organization data about the structure of the partial frame for controlling the transmission between FMT and RMT to enable a communication between RMT and AP, and
   (b) in that the structure of the partial frame is so similar to the frame generated by the AP that an MT, which is designed for operation at an AP, can also serve as an RMT and permits the exchange of data between RMT and FMT.

2. A method as claimed in claim 1, characterized in that the organization of the partial frame structures is exclusively effected by a central controller in the AP.

3. A method as claimed in claim 1, characterized in that the organization of the partial frame structures is effected by a decentralized control in the forwarder mobile terminal (FMT).

4. A method as claimed in claim 1, characterized in that the organization of the partial frame structures is partly effected by a central controller in the access point (AP) and partly by a decentralized controller in the forwarding mobile terminal (FMT).

5. A method as claimed in claim 1, characterized in that a mobile terminal (MT) can become an AP and take over the role of a central station (in so far this is possible with the system), while there are RMTs with respect to the AP.

6. A method as claimed in claim 1, characterized in that a cascading of the relay function is possible while a station controlled as an RMT seen from the point of view of an FMT can simultaneously be an FMT with respect to another station, and in the original partial frame structure further partial frame structures are recursively formed of which a depth corresponds to a number of the hops used between the AP and the most remote RMT in the cascade.

7. A method as claimed in claim 1, characterized in that an access point (AP) can cover a plurality of mobile terminals (MT) and forwarder mobile terminals (FMT) while each MT can have the functionality of an FMT.

8. A method as claimed in claim 1, characterized in that the FMT can simultaneously cover a plurality of RMTs.

9. A method as claimed in claim 1, characterized in that the assignment of the capacity for the relay path in the time domain (TDMA) can be effected in suitable systems, but also in the frequency domain (FDMA) or code domain (CDMA).

10. A method as claimed in claim 1, characterized in that there may be a plurality of FMTs that simultaneously cover their associated RMTs in various areas of the cell, while partial frames are simultaneously transmitted at different spots in the cell.

11. A method as claimed in claim 1, characterized in that the length of the frames of the AP and partial frames of the FMT can dynamically vary and be different.

12. A method as claimed in claim 1, characterized in that an arrangement of individual phases in the partial frames is dynamically changed, divided, can partly fail and new phases can additionally be defined.

13. A method as claimed in claim 1, characterized in that a direct exchange of data is effected between the associated RMTs by controlling a common FMT.

14. A method as claimed in claim 1, characterized in that a direct exchange of data is effected between the MT, controlled by the AP, and the RMT, controlled by the associated FMT.

15. A method as claimed in claim 1, characterized in that a point-to-multipoint mode is used for transferring useful data.

* * * * *